(12) United States Patent
Currington

(10) Patent No.: US 11,629,639 B2
(45) Date of Patent: Apr. 18, 2023

(54) JET ENGINE COVER

(71) Applicant: Rufus Currington, Tyler, TX (US)

(72) Inventor: Rufus Currington, Tyler, TX (US)

( * ) Notice: Subject to any disclaimer, the term of this patent is extended or adjusted under 35 U.S.C. 154(b) by 0 days.

(21) Appl. No.: 17/734,136

(22) Filed: May 2, 2022

(65) Prior Publication Data
US 2023/0058777 A1 Feb. 23, 2023

Related U.S. Application Data

(60) Provisional application No. 63/233,823, filed on Aug. 17, 2021.

(51) Int. Cl.
*F02C 7/05* (2006.01)
*F02C 7/055* (2006.01)

(52) U.S. Cl.
CPC ........ *F02C 7/055* (2013.01); *F05D 2220/323* (2013.01)

(58) Field of Classification Search
CPC .. F02C 7/055; F02C 7/05; F02C 7/052; F05D 2220/323
See application file for complete search history.

(56) References Cited

U.S. PATENT DOCUMENTS

| 4,439,218 A | * | 3/1984 | Priepke | B01D 46/10 55/288 |
| 2017/0334571 A1 | * | 11/2017 | Bai | B64D 33/02 |
| 2019/0316521 A1 | * | 10/2019 | Fraser-Beekman | F02C 7/055 |

\* cited by examiner

*Primary Examiner* — Jacob M Amick
(74) *Attorney, Agent, or Firm* — Brennan, Manna & Diamond, LLC

(57) ABSTRACT

A deflecting device for protecting a jet engine of an aircraft from damage caused by a bird strike. The bird strike deflection device attaches to an opening in the front of a cowling of the jet engine to shield an engine air intake from ingesting a bird that would otherwise damage the engine. A conically shaped screening portion having an open mesh pattern is attached to the cowling in a convex orientation. A perimeter of the screening portion terminates in a rim sized to fit the engine intake opening in the cowling. The rim may be directly attached to the cowling or an attachment flange may connect the rim to the cowling. The deflecting device may be completely removable from, hingedly attached to, or integrated directly into the cowling.

19 Claims, 10 Drawing Sheets

JET ENGINE COVER

CROSS-REFERENCE TO RELATED APPLICATION

The present application claims priority to, and the benefit of, U.S. Provisional Application No. 63/233,823, which was filed on Aug. 17, 2021 and is incorporated herein by reference in its entirety.

FIELD OF THE INVENTION

The present invention generally relates to a protective device for an airplane engine, and more specifically to a protective cover for a jet engine configured to protect the engine from bird strikes while in flight. Accordingly, the present specification makes specific reference thereto. However, it is to be appreciated that aspects of the present invention are also equally amenable to other like applications, devices, and methods of manufacture.

BACKGROUND

A jet engine is generally an internal combustion reaction engine capable of discharging a fast moving jet that generates thrust by jet propulsion. Airbreathing jet engines characteristically feature a rotating air compressor powered by a turbine, with the leftover power providing thrust through a propelling nozzle. Most modern subsonic jet aircraft use more complex turbofan engines. The engine sucks air in at the front with a fan. A compressor, made with many blades attached to a shaft, raises the pressure of the air. The blades spin at high speed and compress or squeeze the air. The compressed air is then sprayed with fuel and an electric spark ignites the mixture. The burning gases expand and blast out through the nozzle at the back of the engine. As the jets of gas shoot backward, the engine and the aircraft are thrust forward. As the hot air is going to the nozzle, it passes through another group of blades called the turbine. The turbine is attached to the same shaft as the compressor. Spinning the turbine causes the compressor to spin.

Standard commercial aircraft feature open air intakes to help remain elevated in the air. Unfortunately, foreign objects and animals can accidentally fly into the intake area, causing serious damage and potential malfunctions. If this occurs while the airplane is in the air, tragic accidents and injuries can occur. Birds often crash with any of an airplane's forward-facing edges, including the wings, nose cone, and the jet engine. These bird strikes have been known to strike the windshield or canopy of aircraft, causing the surface of the top or glass to break. These fractures can occasionally alter air pressure within the cabin, resulting in altitude loss or other flight-related issues. One of the most hazardous situations occur when a bird strikes the turbine and becomes trapped in the engine. The bird can create a disturbance in the rotatory action of the fan blades after becoming ingested in the engine, resulting in a partial or total failure of the affected engine. In the United States, a bird-strike event has been estimated to occur about once in every 2,000 flights, depending on the time of year and flight location.

The extent of the damage caused by the bird attack is determined by numerous factors. First is the aircraft's size. Smaller aircraft and propeller-driven machines are more sensitive to major damage, such as windshield, control surface, or engine penetration. Windscreen penetration might also possibly harm pilots or other passengers on board, resulting in a loss of aircraft control with potentially fatal results. When a bird flies into a large airplane, the engines frequently malfunction or even fail completely. If a bird is pulled into an engine, the fan blades can easily sustain severe damage. This can cause extreme vibration complicating control of the aircraft and result in complete engine thrust failure.

Current statistics show that incidents of bird ingestion by commercial aircraft jet engines are increasing and are expected to be a continuing challenge. One of the main factors contributing to this avian threat is increased air traffic, especially because most aircraft are now powered with quieter turbofan jet engines. While this is beneficial for urban noise reduction, it does not give birds more notice to avoid collisions. Another factor is increasing populations of large birds which is not easily controllable.

There are three main approaches to reducing aviation bird strikes: changing the birds' habitats, monitoring the birds' behavior, and changing the aircraft's behavior. For example, air cannons may be used to scare birds off airport land when birds are present in an area of aircraft activity. Airports also can alter the nearby landscape to be less bird-friendly, filling in ponds or replacing grass with gravel. However, this only has effect directly around the airport. Changing aircraft behavior has proven more difficult.

Accordingly, there is a great need for a device that can change aircrafts' behavior. There is also a need for a device for preventing damage to jet engines from bird strikes. Specifically, there is a need for a porous cover for protecting commercial aircraft propeller intakes. There is also a need for a device configured to reduce the chance of damage and serious accidents and malfunctions from occurring while a commercial airplane is in operation. Further, there is a need for a protective device designed to allow proper airflow to the engine while preventing birds and other foreign debris from entering the intake.

In this manner, the improved protective jet engine cover of the present invention accomplishes all of the forgoing objectives, thereby providing an easy solution for decreasing the likelihood of damage to an airplane caused by bird strikes. A primary feature of the present invention is a porous cover for commercial aircraft propeller intakes. The present invention features several openings to maintain proper airflow while preventing birds and other foreign debris from entering the engine intake. Finally, the improved protective jet engine cover of the present invention is capable of decreasing likelihood of damage and serious accidents to aircraft engines while flying.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a bird strike deflection device. The a bird strike deflection device is configured to allow for the adequate intake of air by the aircraft while protecting the jet engine from damage from potential bird strikes. The bird strike deflection device is attachable to a cowling housing a jet engine of an airplane. An air intake to the jet engine is protectively screened when the bird strike deflection device is in place over the air intake.

The bird strike deflection device comprises a deflecting component and an attachment component. The deflecting component comprises a deflector body and a rim. The deflector body comprises a conically shaped screen extending outward from a base perimeter. The conically shaped screen then terminates in an apex convexly oriented to the air intake when the deflecting component is in place over the air intake. The rim is nonporous and extends from and surrounds the base perimeter of the deflecting component.

The conically shaped screen is structured to deflect a bird without impeding airflow into the jet engine enough to interfere with the operation of the jet engine. The conically shaped screen may have a structured or an unstructured pattern. The deflecting component may further comprise a nose cone. The nose cone is typically a solid cone that covers the apex of the conically shaped screen.

The attachment component is configured to secure the deflecting component to the cowling covering the air inlet of the jet engine. The attachment component comprises a flange body and a plurality of attachment elements. The flange body is attached to and extends perpendicularly outward from the rim. The flange body is further shaped to engage and fit the cowling. The plurality of attachment elements are configured to removably attach the bird strike deflection device to the cowling. The attachment component may alternatively be hingedly attached to the cowling and further comprise a locking element securing the flange body in place when in use.

The bird strike deflection device may further comprise a debris clearing component. The debris clearing component is attached to and extends outwardly from the nose cone. The debris clearing component comprises a rotatable wiper blade. The rotatable wiper blade extends downward from the nose cone. The rotatable wiper blade is generally arcuate in shape to fit the conically shaped screen.

The subject matter disclosed and claimed herein, in another embodiment thereof, comprises a bird strike deflection device. The a bird strike deflection device is configured to allow for the adequate intake of air into a jet engine while protecting the jet engine from bird strikes. The bird strike deflection device is integrated into and extends outward from a jet engine cowling housing adjacent to an engine air inlet of the jet engine of an airplane.

The bird strike deflection device comprises a jet engine cowling and a deflecting component. The deflecting component comprises a deflector body and a rim. The deflector body comprises a conically shaped screen extending outward from a base perimeter. The conically shaped screen then terminates in an apex convexly oriented to the air intake when in place attached to the cowling. The rim is solid in construction and extends from and surrounds the base perimeter of the deflecting component. The rim is seamlessly integrated into the cowling.

The convexly conically shaped screen is structured to deflect a bird without impeding airflow into the jet engine enough to interfere with operation of the jet engine. The convexly conically shaped screen may have a structured or an unstructured pattern. The deflecting component may further comprise a nose cone. The nose cone is typically a solid cone that covers the apex of the conically shaped screen.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
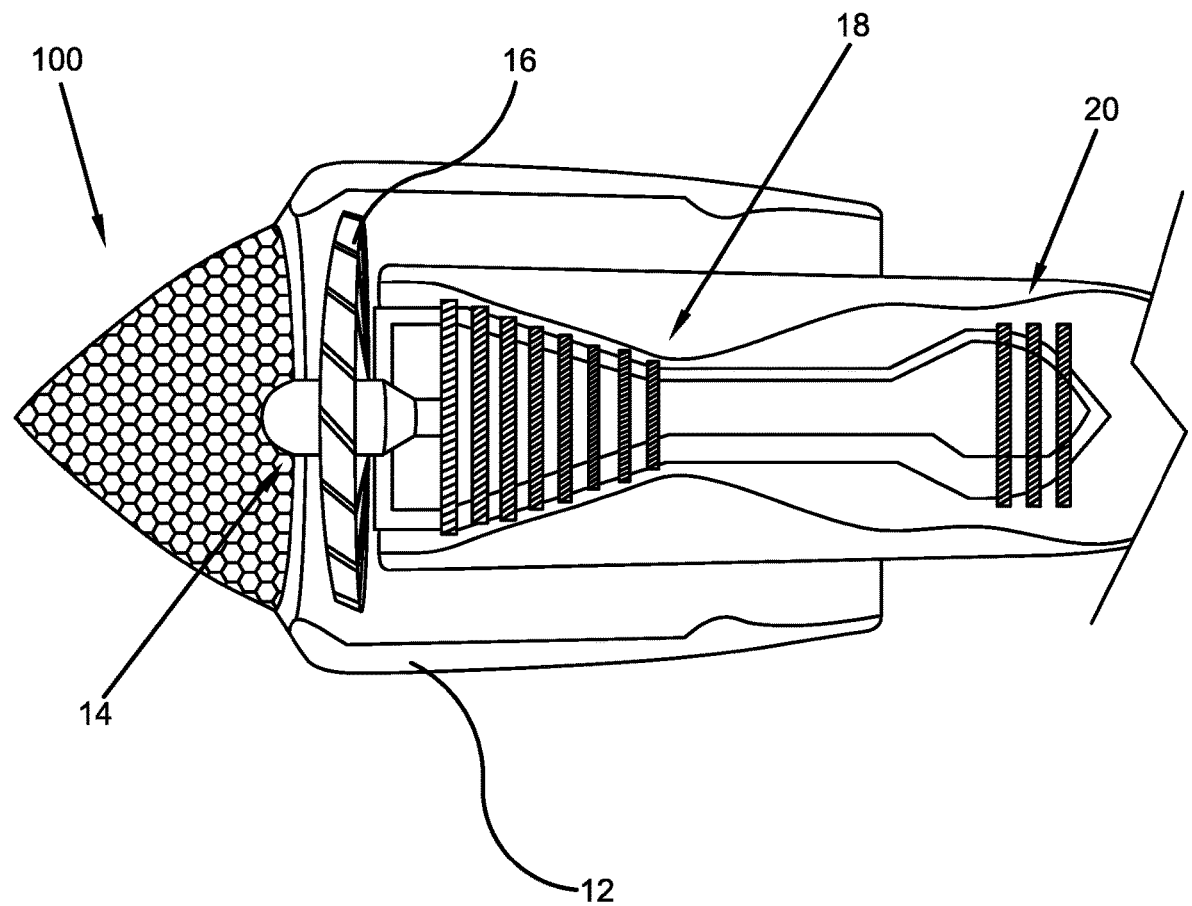
FIG. 1 illustrates a cutaway side view of a bird strike deflection device of the present invention for protecting a jet engine of an airplane from damage from a bird strike in accordance with the disclosed architecture.
Figure 2:
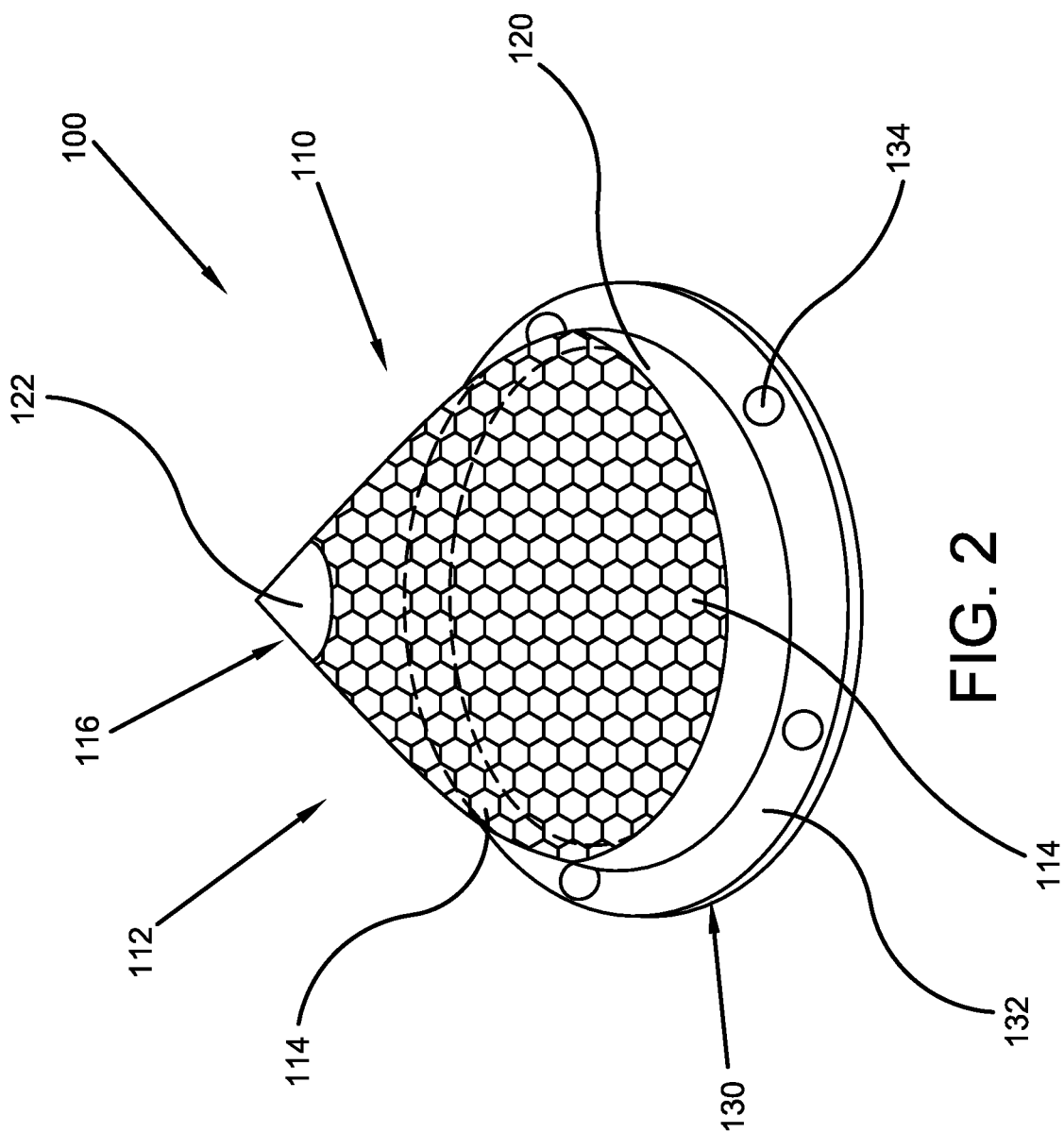
FIG. 2 illustrates a perspective view of the bird strike deflection device of the present invention for protecting the jet engine of the airplane from damage from a bird strike in accordance with the disclosed architecture.
Figure 3:
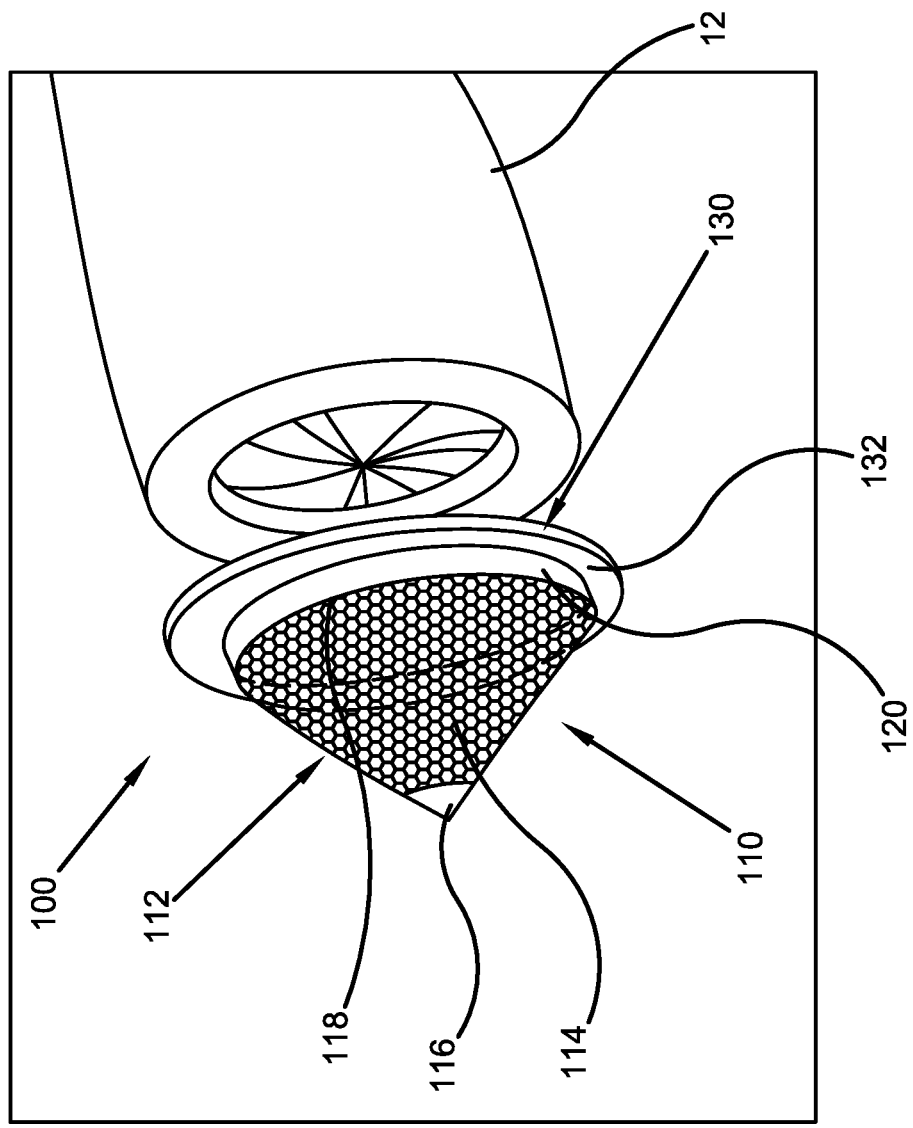
FIG. 3 illustrates a perspective view of the bird strike deflection device of the present invention for protecting the jet engine of the airplane from damage from a bird strike separated from a cowling of the jet engine in accordance with the disclosed architecture.
Figure 4:
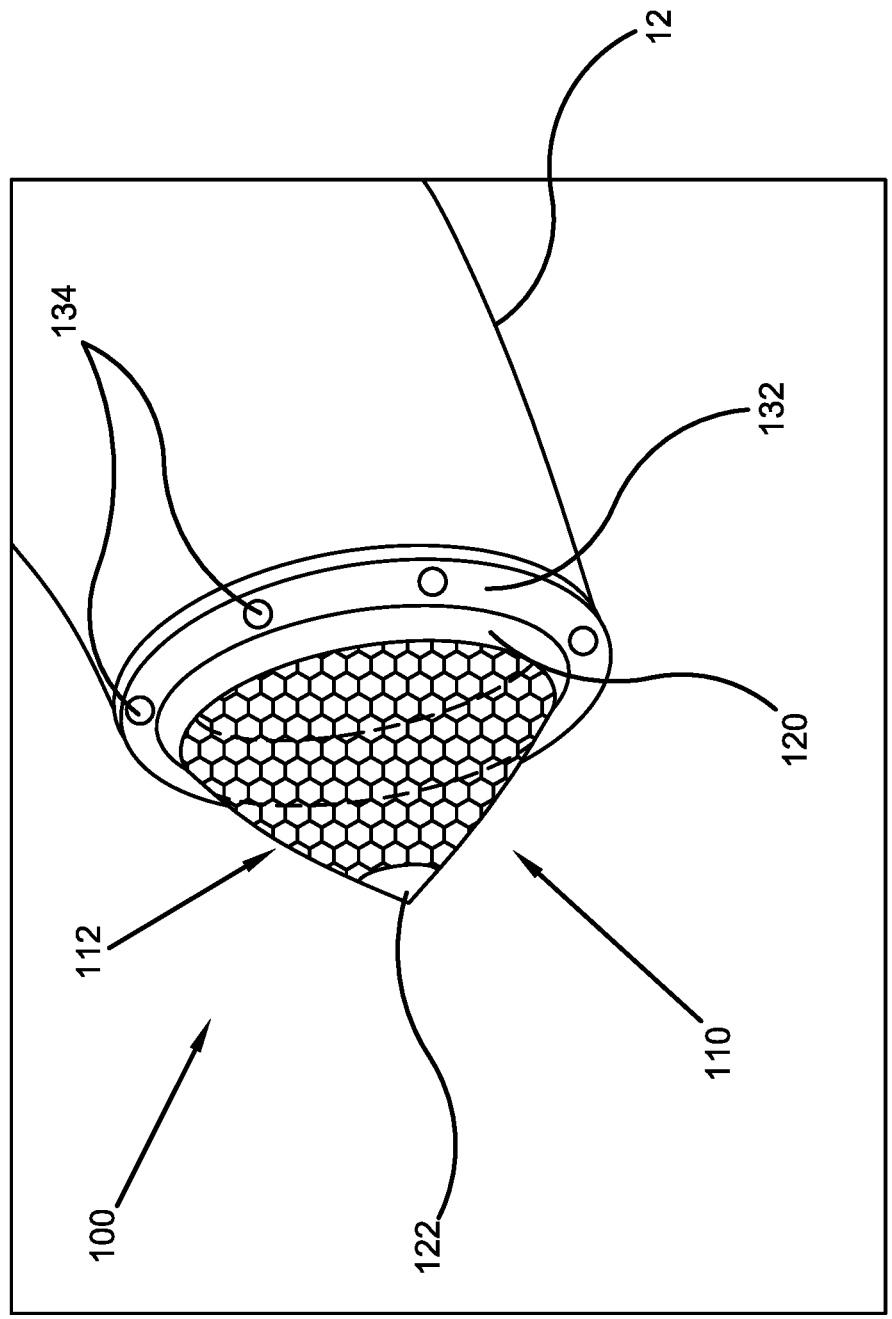
FIG. 4 illustrates a perspective view of the bird strike deflection device of the present invention for protecting the jet engine of the airplane from damage from a bird strike attached to the cowling of the jet engine in accordance with the disclosed architecture.
Figure 5:
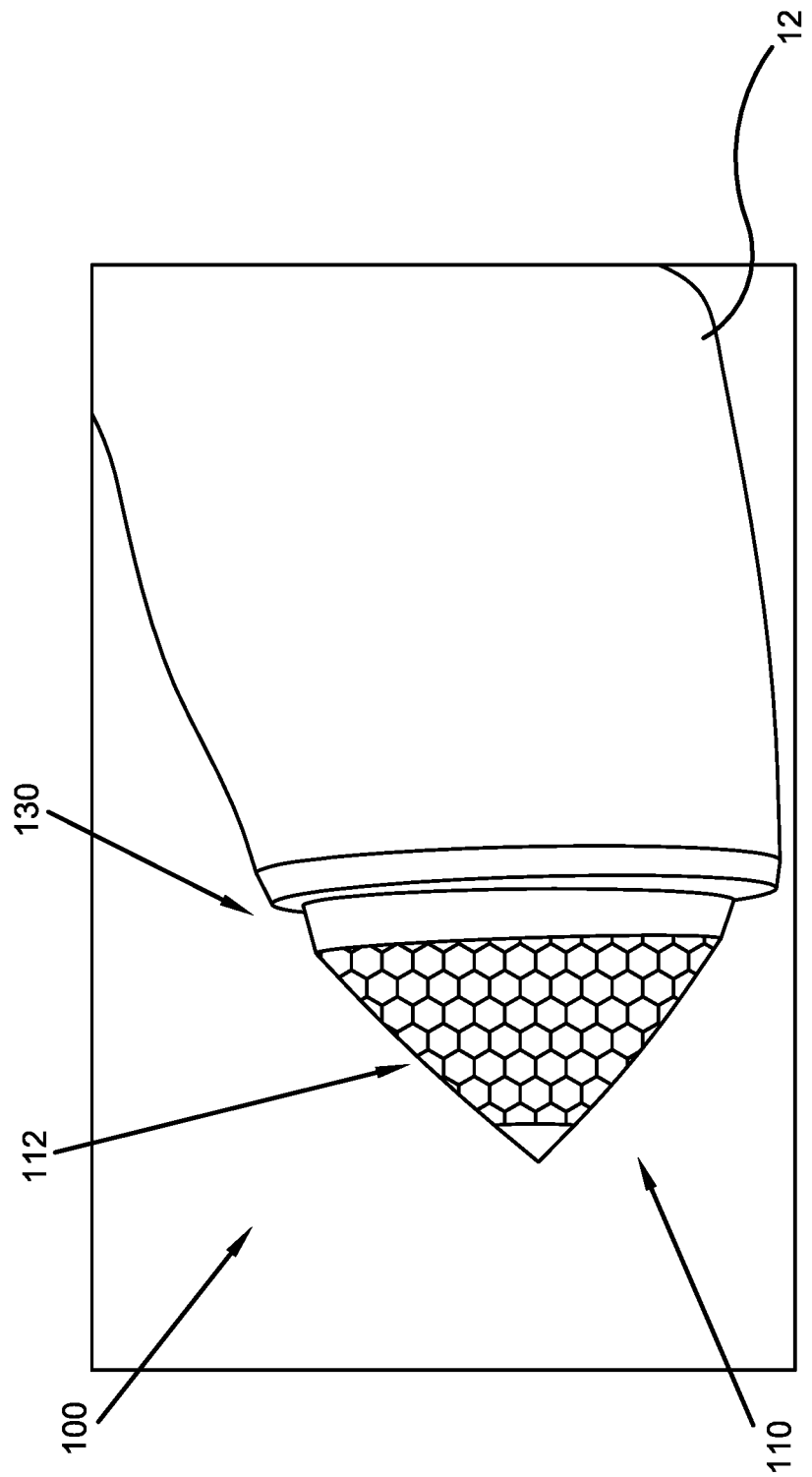
FIG. 5 illustrates a side perspective view of the bird strike deflection device of the present invention for protecting the jet engine of the airplane from damage from a bird strike attached to the cowling of the jet engine in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention, in one exemplary embodiment, is a relatively large and circular metal porous covering for an air intake in front of an aircraft engine. The device will allow for the intake of air by the aircraft, but will keep foreign objects, including birds and other animals, from causing damage to the aircraft. The cover may include a wiper that will clear birds and other debris and objects off the screen after impact to maintain adequate air flow to the engine. The covering can be attached by a plurality of latches and can allow the cover to swing open like a door. A locking latch on the opposite side can offer easy access for working on or inspecting the aircraft as needed.

Referring initially to the drawings, FIGS. 1-9 illustrate a bird strike deflection device 100. As illustrated in FIG. 1, the bird strike deflection device 100 is designed for protecting a jet engine 18 of an engine system 10 of an aircraft from damage due to a bird strike. The engine system 10 typically comprises a cowling 12 housing the jet engine 18. An air intake 14 allows the flow of air past a fan 16 and into the jet engine 18 powering a turbine 18. There must be sufficient airflow through the air inlet 14 for the jet engine 18 to function properly.

The a bird strike deflection device 100 is constructed to allow for the adequate intake of air by the aircraft while simultaneously protecting the jet engine 18 from damage from potential bird strikes. The bird strike deflection device 100 is attachable directly to an exterior of the cowling 12 adjacent to the air intake 14. When the bird strike deflection device 100 is in place over the air intake, the air intake 14 to the jet engine 18 is protectively screened and protected from inadvertently ingesting a bird or other debris.

As illustrated in FIGS. 2-5, the bird strike deflection device 100 comprises a deflecting component 110 and an attachment component 130. The deflecting component 110 comprises a deflector body 112 and a rim 120. The deflector body 112 comprises a generally conically shaped screen 114, an apex 116, and a base perimeter 118. The conically shaped screen 114 extends outward from the base perimeter 118 which is sized to fit the cowling 12 surrounding and adjacent to the air intake 14.

The conically shaped screen 114 extends outward and terminates in the apex 116. The conically shaped screen 114 is convexly oriented to the air intake 14 when the deflecting component 110 is attached to the cowling 12 and in place over the air intake 14. The rim 120 is typically solid and nonporous in construction. The rim 120 extends from and surrounds the base perimeter 118 of the deflecting component 110. The rim 120 provides reinforcement and structural integrity for the deflecting component 110.

Figure 8A:
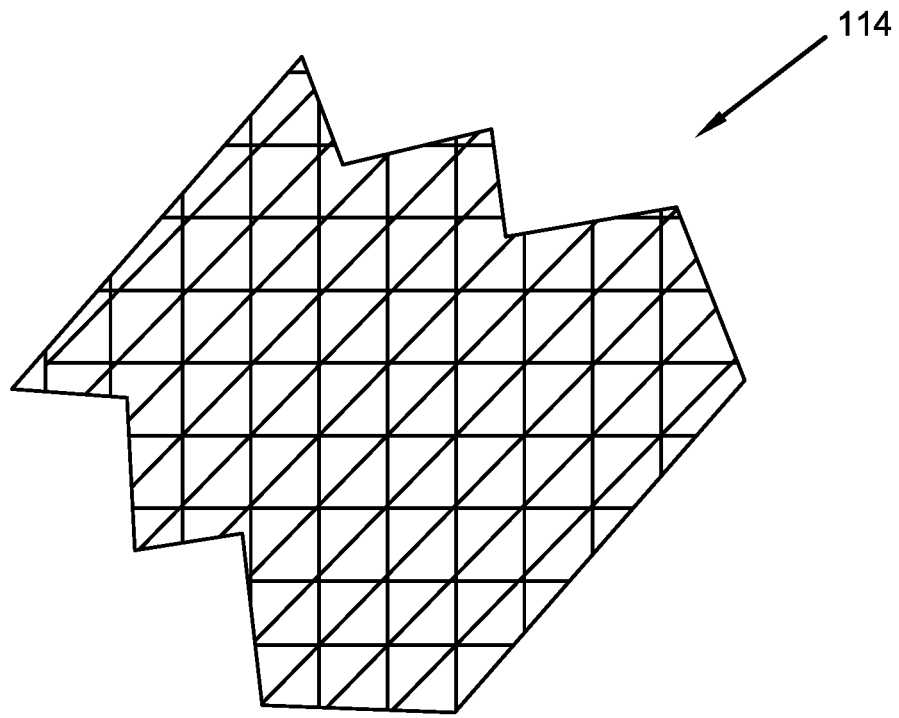
FIG. 8A illustrates a cutaway view of one pattern of a screen of a deflector body of the bird strike deflection device of the present invention for protecting the jet engine of the airplane from damage from a bird strike in accordance with the disclosed architecture.

The conically shaped screen 114 is structured to deflect a bird without impeding adequate airflow into the jet engine 18 significant enough to interfere with the operation of the jet engine 18. The conically shaped screen 114 may be constructed as an open mesh or screen and have a structured or an unstructured pattern. As illustrated in FIG. 8A, structured meshes or screens are meshes or screens with the cells arranged in a particular order so that the topology of such mesh is regular. Neighboring cells and points are easily identifiable because of their formation and structure. Structured meshes or screens are applied over rectangular, elliptical, spherical coordinate systems forming a regular grid pattern. For example, the conically shaped screen 114 may have a honeycomb, triangular, diamond, or other geometric shape.

Figure 8B:
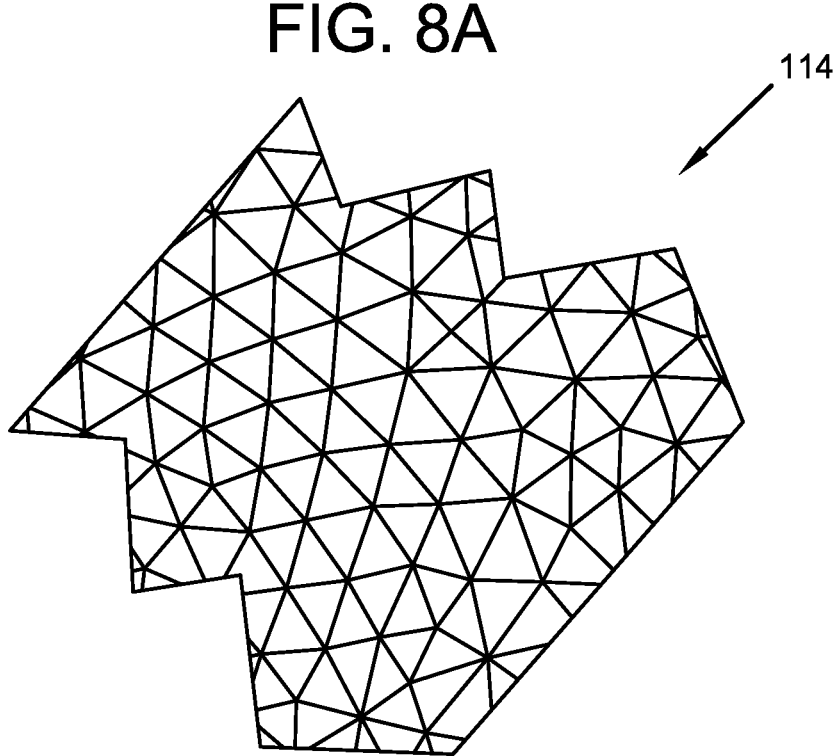
FIG. 8B illustrates a cutaway view of another pattern of a screen of a deflector body of the bird strike deflection device of the present invention for protecting the jet engine of the airplane from damage from a bird strike in accordance with the disclosed architecture.

As illustrated in FIG. 8B, unstructured meshes or screens are more general and can randomly form any geometry shape. Unlike structured meshes or screens, unstructured meshes or screens do not follow a uniform pattern as the connectivity pattern is not fixed. Advantageously, unstructured meshes or screens can be more flexible than structured patterns. Unstructured meshes or screens are generally used in complex mechanical engineering projects and can be customizable. The conically shaped screen 112 is constructed from aerospace grade aluminum, composite materials, or other lightweight materials typically used to make aircraft components.

Figure 7:
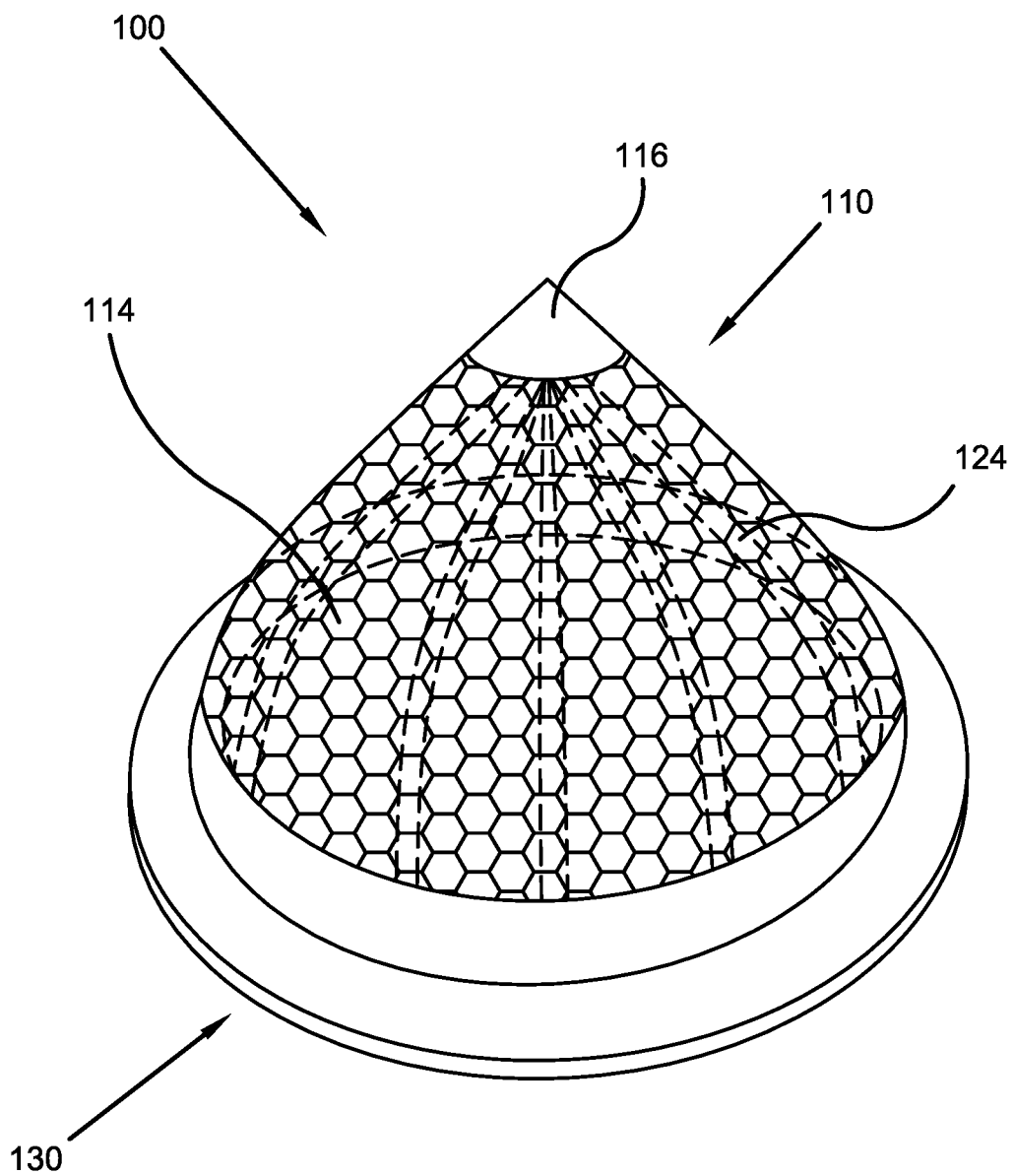
FIG. 7 illustrates a perspective view of the bird strike deflection device of the present invention for protecting the jet engine of the airplane from damage from a bird strike in accordance with the disclosed architecture.

The deflecting component 110 may further comprise a nose cone 122. The nose cone 122 is typically a solid cone that covers the apex 116 of the conically shaped screen 112 providing additional reinforcement and structural integrity for the deflecting component 110. As illustrated in FIG. 7, the deflecting component 110 may further comprise a plurality of structural ribs 124. The plurality of structural ribs 124 extend generally upward from the base perimeter 118 to the apex 116 providing additional reinforcement and structural integrity for the deflecting component 110.

The attachment component 130 is configured to secure the deflecting component 110 to the cowling 12 so that the deflecting component 110 covers the air inlet 14 of the jet engine 18. The attachment component 130 comprises a flange body 132 and a plurality of attachment elements 134. The flange body 132 is of solid construction and is attached to and extends substantially perpendicularly outward from the rim 120 of the deflecting component 110. The flange body 132 is further shaped to engage and fit the cowling 12. The flange body 132 may be molded to the shape of the cowling 12 to ensure a customized fit.

The plurality of attachment elements 134 are configured to removably attach the bird strike deflection device 100 to the cowling 12. The plurality of attachment elements 134 may be bolts, clamps, latches, or any similar mechanical fastener. Alternatively, the plurality of attachment elements 134, may be rivets or similar permanent mechanical fasteners used to permanently attach the bird strike deflection device 100 to the cowling 12.

Figure 6:
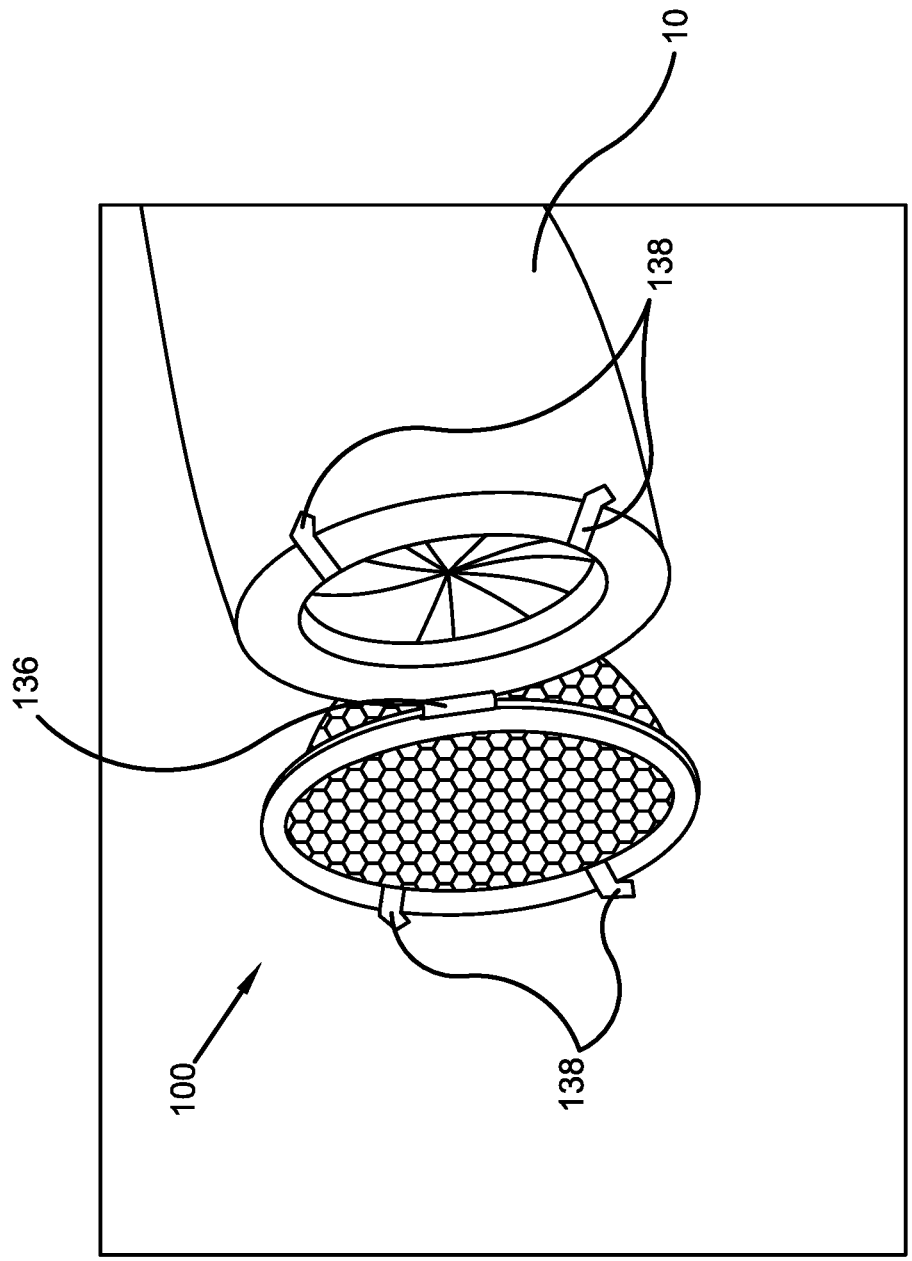
FIG. 6 illustrates a perspective view of the bird strike deflection device of the present invention for protecting the jet engine of the airplane from damage from a bird strike hingedly attached to the cowling of the jet engine in accordance with the disclosed architecture.

The attachment component 130 may alternatively be hingedly attached to the cowling 12. As illustrated in FIG. 6, the attachment component 130 may further comprise a hinge element 138 and a locking element 138. The hinge element 136 allows the deflecting component 110 to swing open away from the cowling 12 to permit access to the jet engine 18 for inspection or maintenance. The locking element secures the deflecting component 110 for use locking the flange body 132 to the cowling 12.

Figure 9:
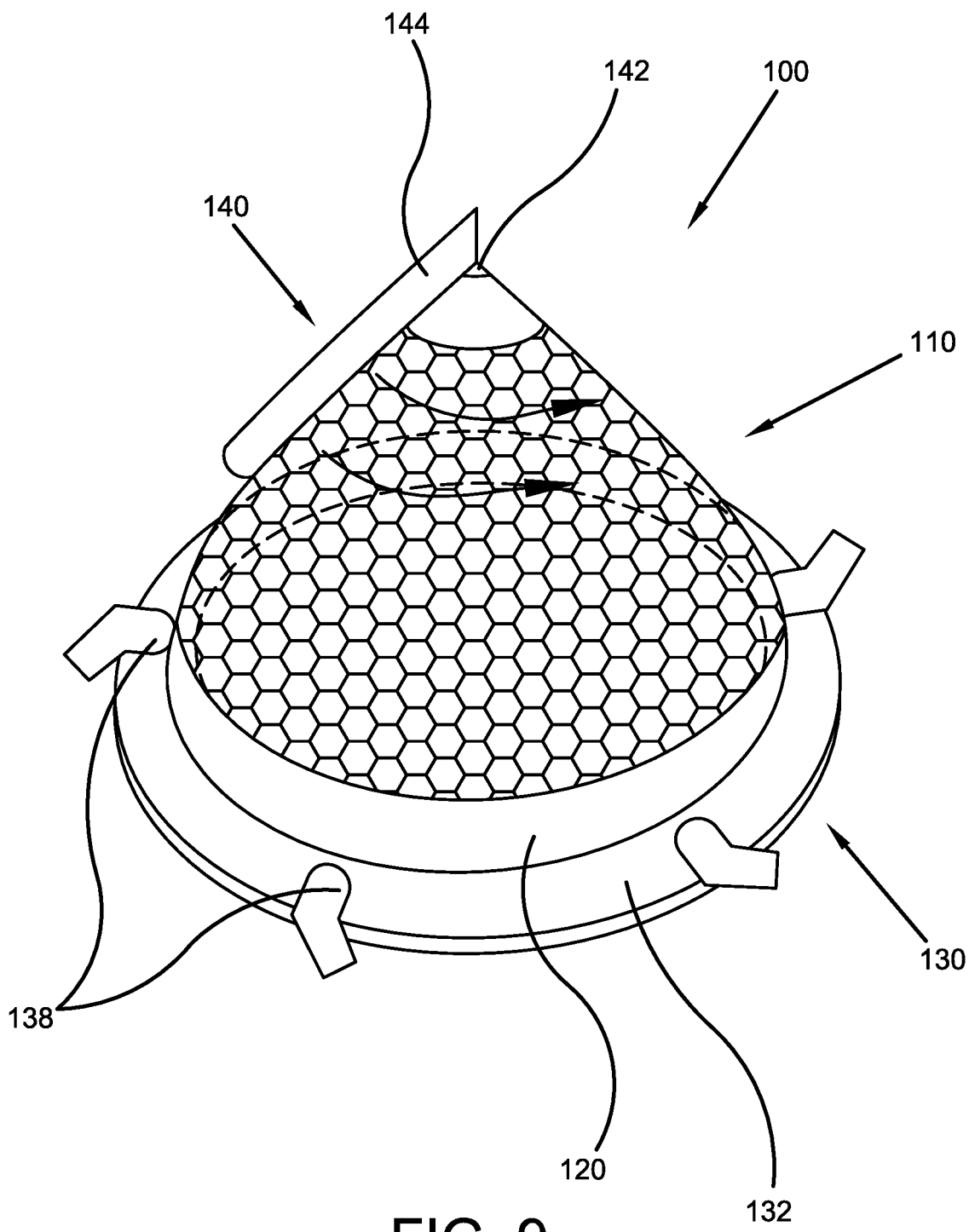
FIG. 9 illustrates a perspective view of a debris clearing component of the bird strike deflection device of the present invention for protecting the jet engine of the airplane from damage from a bird strike in accordance with the disclosed architecture.

As illustrated in FIG. 9, the bird strike deflection device 100 may further comprise a debris clearing component 140. The debris clearing component 140 is attached to and extends outwardly from the nose cone 122 of the apex 116 of the deflection component 110. The debris clearing component 140 comprises a rotatable wiper blade 144. The rotatable wiper blade 144 is attached to the nose cone 122 by a rotatable connecting element 144 so that the rotatable wiper blade 144 is free to move. The rotatable wiper blade 144 then extends downward from the nose cone 122 and is arcuate in shape to fit the conically shaped screen 114. The rotatable wiper blade 144 is configured to remove debris from the conically shaped screen 114 following a bird strike. The debris clearing component 140 may be wind driven or be in electrical communication with the aircraft to receive power.

Figure 10:
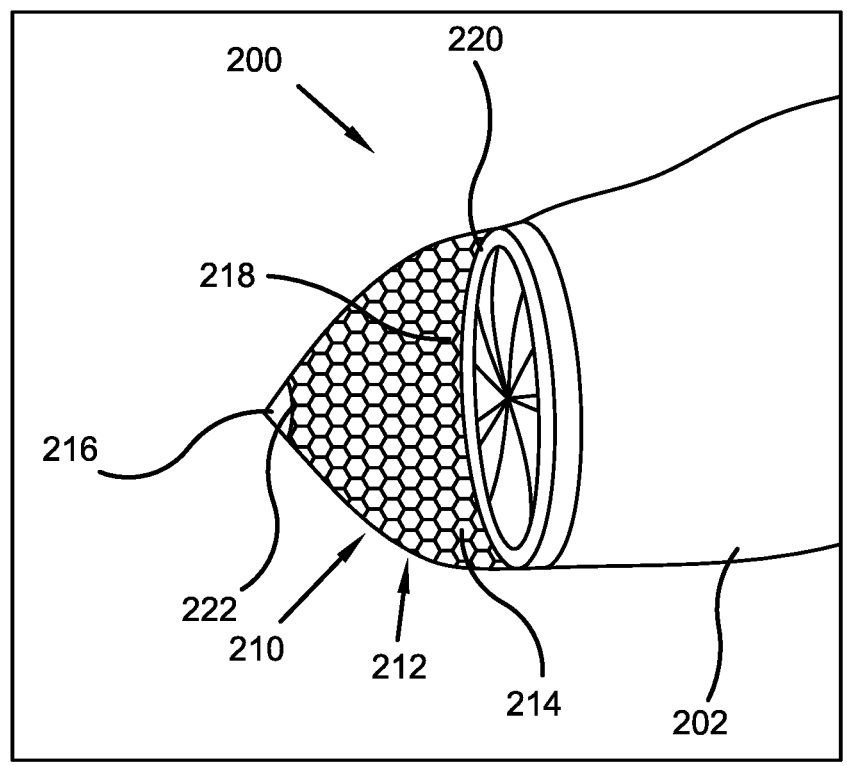
FIG. 10 illustrates a perspective view of a bird strike deflection device of the present invention for protecting a jet engine of an airplane from damage from a bird strike in accordance with the disclosed architecture.

FIG. 10 illustrate an additional embodiment of a bird strike deflection device 200. The a bird strike deflection device 200 is configured to allow for the intake of air into the jet engine 18 while protecting the jet engine 18 from bird strikes. The bird strike deflection device 200 is integrated into and extends outward from the jet engine cowling housing adjacent to the engine air inlet 14 of the jet engine 18 of an airplane.

The bird strike deflection device 200 comprises a jet engine cowling 202 and a deflecting component 210. The deflecting component 210 comprises a deflector body 212 and a rim 220. The deflector body 212 comprises a generally convexly conically shaped screen 214, an apex 216, and a base perimeter 218. The conically shaped screen 214 extends outward from the base perimeter 218 which is sized to fit the cowling 202 surrounding and adjacent to the air intake 14.

The conically shaped screen 214 then terminates in the apex 216. The conically shaped screen 214 is convexly oriented to the air intake 14 when the deflecting component 210 is integrated into the cowling 202 and in place over the air intake 14. The rim 120 is typically solid and nonporous in construction. The rim 120 extends from and surrounds the base perimeter 118 of the deflecting component 110. The rim 120 is seamlessly integrated into the cowling 202

The conically shaped screen 214 is structured to deflect a bird without impeding adequate airflow into the jet engine 18 significant enough to interfere with the operation of the jet engine 18. The conically shaped screen 214 may be constructed as an open mesh or screen and have a structured or an unstructured pattern as discussed supra. The deflecting component 210 may further comprise a nose cone 222. The nose cone 222 is typically a solid cone that covers the apex 216 of the conically shaped screen 212 providing additional reinforcement and structural integrity for the deflecting component 210.

Notwithstanding the forgoing, the bird strike deflection devices 100 and 200 can be any suitable size, shape, and configuration as is known in the art without affecting the overall concept of the invention, provided that it accomplishes the above stated objectives. One of ordinary skill in the art will appreciate that the shape and size of the bird strike deflection devices 100 and 200 and their various components, as show in the FIGS. are for illustrative purposes only, and that many other shapes and sizes of the bird strike deflection devices 100 and 200 are well within the scope of the present disclosure. Although dimensions of the bird strike protection devices 100 and 200 and their components (i.e., length, width, and height) are important design parameters for good performance, the bird strike deflection devices 100 and 200 and their various components may be any shape or size that ensures optimal performance during use and/or that suits user need and/or preference. As such, the bird strike deflection devices 100 and 200 may be comprised of sizing/shaping that is appropriate and specific in regard to whatever the bird strike deflection device 100 and 200 are designed to be applied.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A bird strike deflection device for protecting a jet engine of an airplane, the bird strike deflection device comprising:
    a deflecting component comprising:
    a deflector body comprising a conically shaped screen extending from a base perimeter to an apex; and
    a rim extending from and surrounding the base perimeter; and
    an attachment component; and
    wherein the attachment component is configured to secure the deflecting component to a cowling covering an engine air inlet of the jet engine; and
    wherein the conically shaped screen has an unstructured pattern.

2. The bird strike deflection device of claim 1, wherein the conically shaped screen has a structured pattern.

3. The bird strike deflection device of claim 1, wherein the conically shaped screen is structured to deflect a bird without significantly limiting airflow into the jet engine.

4. The bird strike deflection device of claim 1, wherein the deflecting component further comprises a solid nose cone covering the apex.

5. The bird strike deflection device of claim 1, wherein the conically shaped screen is constructed from aerospace grade aluminum.

6. The bird strike deflection device of claim 1, wherein the attachment component comprises a flange body shaped to engage the cowling.

7. The bird strike deflection device of claim 1, wherein the attachment component comprises a plurality of attachment elements for removably attaching the bird strike deflection device to the cowling.

8. The bird strike deflection device of claim 1, wherein the deflector body further comprises a plurality of structural ribs extending from the base perimeter to the apex.

9. A bird strike deflection device for protecting a jet engine of an airplane, the bird strike deflection device comprising:
    a deflecting component comprising:
    a deflector body comprising a convex conically shaped screen extending from a base perimeter to an apex;
    a solid rim extending from and surrounding the base perimeter; and
    a nose cone covering the apex; and
    an attachment component comprising a flange body extending perpendicularly outward from the rim and a plurality of attachment elements configured to secure the deflecting component to a cowling covering an engine air inlet of the jet engine; and wherein the deflector body further comprises a plurality of structural rips, each structural rib extending upward from the base perimeter to the apex.

10. The bird strike deflection device of claim 9, wherein the convex conically shaped screen has a honeycombed pattern.

11. The bird strike deflection device of claim 9, wherein the convex conically shaped screen is structured to deflect a bird without significantly limiting airflow into the jet engine.

12. The bird strike deflection device of claim 9, wherein the flange body is shaped to engage the cowling.

13. The bird strike deflection device of claim 9, wherein the attachment component is hingedly attached to the cowling.

14. The bird strike deflection device of claim 13, wherein the attachment component further comprises a locking element.

15. The bird strike deflection device of claim 9 further comprising a debris clearing component.

16. The bird strike deflection device of claim 15, wherein the debris clearing component comprises a rotatable wiper blade extending from the nose cone downward along the convex conically shaped screen.

17. A bird strike deflection device for protecting a jet engine of an airplane, the bird strike deflection device comprising:

a jet engine cowling;
a deflecting component comprising:
a deflector body comprising a convex conically shaped screen having an unstructured pattern extending from a base perimeter to an apex;
a solid rim extending from and surrounding the base perimeter; and
an arcuate shaped rotatable wiper blade extending from the apex downward along the convex conically shaped screen toward the solid rim configured to remove debris from the convex conically shaped screen; and
wherein the solid rim of the deflecting component is integrated into and extends outward from the jet engine cowling adjacent to an engine air inlet of the jet engine; and
wherein the deflector body further comprises a plurality of structural ribs, each structural rib extending upward from the base perimeter to the apex.

18. The bird strike deflection device of claim 17, wherein the convex conically shaped screen is structured to deflect a bird without significantly limiting airflow into the jet engine.

19. The bird strike deflection device of claim 17, wherein the deflecting component further comprises a solid nose cone covering the apex.

* * * * *